UNITED STATES PATENT OFFICE.

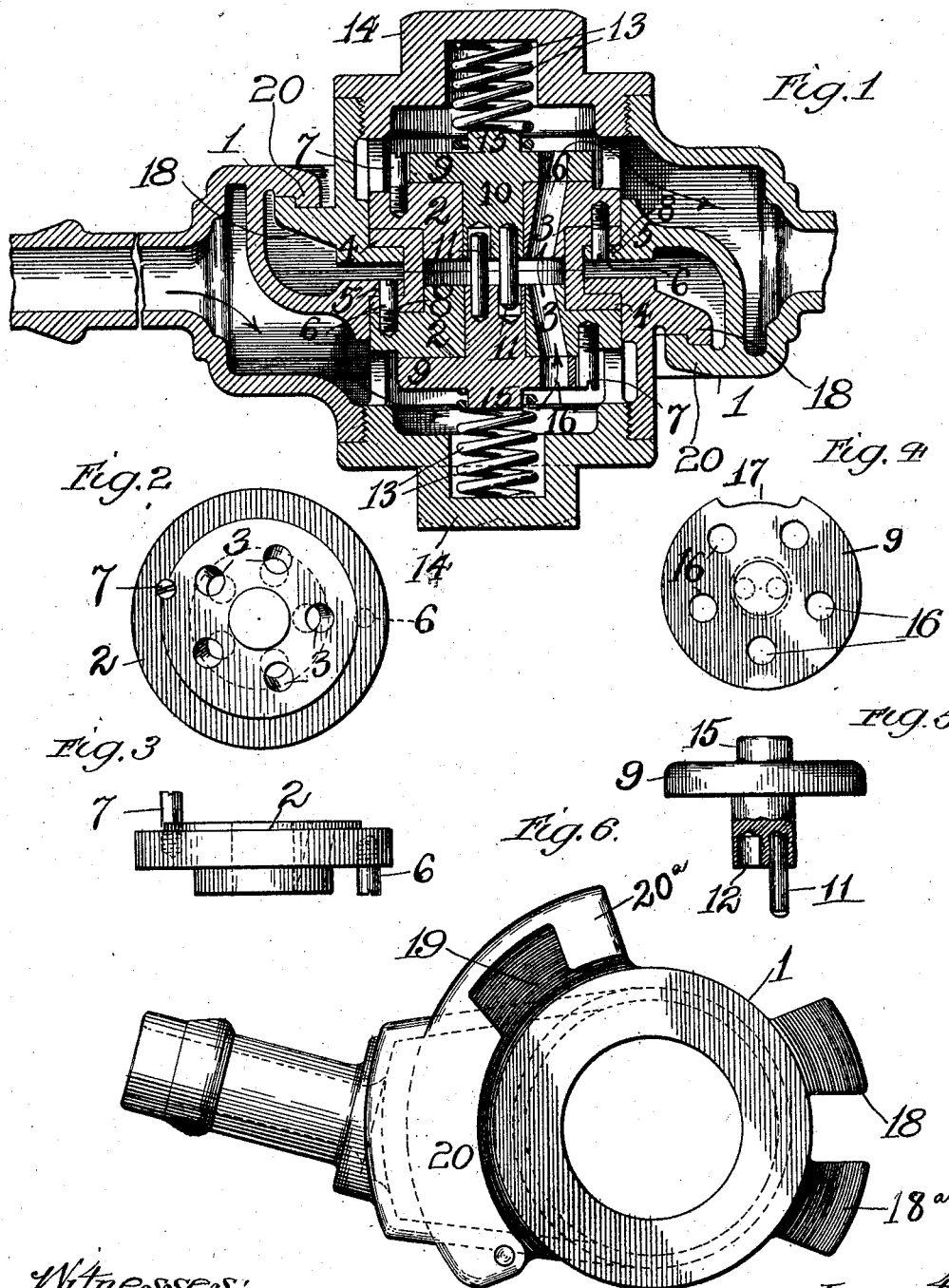

NIELS ANTON CHRISTENSEN, OF MILWAUKEE, WISCONSIN.

HOSE-COUPLING.

No. 823,510.　　　　　Specification of Letters Patent.　　　　Patented June 19, 1906.

Application filed April 29, 1901. Serial No. 57,958.

*To all whom it may concern:*

Be it known that I, NIELS ANTON CHRISTENSEN, a subject of the King of Denmark, residing at Milwaukee, in the county of Milwaukee and State of Wisconsin, have invented certain new and useful Improvements in Hose-Couplings, of which the following is a specification.

My invention relates to hose-couplings; and its object is to produce a simple, efficient, and reliable hose-coupling having a valve positively and automatically opened and closed by the act of coupling or uncoupling two similar hose-couplings.

The advantages in construction of my new coupling will be apparent from the description hereinafter given, taken in connection with the drawings.

In the accompanying drawings, Figure 1 is a section of two of my couplings coupled together, with the passages consequently open; Figs. 2 and 3, plan and side elevation, respectively, of the valve-seat; Figs. 4 and 5, bottom plan and side elevation, respectively, of the valve, the lower portion of the stem of the valve being partially away in Fig. 5 to expose its pin; and Fig. 6, a plan of one of the coupling-heads.

Each coupling-head 1 contains a valve-seat 2, which is provided, preferably, with a series of holes or passages 3 and which is held onto a gasket 4, interposed between it and an annular flange 5. The seat has two headless screws or pins 6 and 7, the former screwing into the bottom of the valve-seat, with its projecting head entering a hole 8 in the annular flange, while the other pin screws into the head or top of the valve-seat, with its projecting head forming a stop for the valve, as hereinafter explained. The pin 6 serves not only to prevent rotation of the valve-seat, but also to locate such seat in proper relative position in assembling the parts.

Each valve comprises a body 9 and a stem 10, having a projecting pin 11 and a longitudinal hole or socket 12 to receive the pin of an opposing valve, as clearly shown in Fig. 1. Each valve is pressed to its seat by a spring 13, bearing at one end against a cap 14, screwing into the head 1, and at the other end against the valve itself, being held centrally thereof preferably by the boss 15. The valve-body has a series of ports or passages 16, corresponding in number to the passages 3 in the valve-seat and adapted to register therewith in coupled position. The periphery of the valve-body is cut away to form the recess or notch 17, (see Fig. 4,) which accommodates the head of pin 7.

The coupling-heads are similar and, as shown, Fig. 6, each of them has a pair of lugs 18 and 18$^a$, the latter one of which is adapted to enter or pass through, in both the coupling and uncoupling operations, the corresponding notch on the other head similar to the notch 19 in the lip or flange 20 of the head shown, while the space between the lugs accommodates the portion 20$^a$ of the flange. Before two heads can be disengaged or uncoupled it is necessary that they be moved to one certain angle defined by the lugs 18, which register at such time with the openings or notches 19, in which defined angle or position both valves in the heads are in lap or closed position. This insures also first a straight movement in the plane of said valves, so that they are absolutely closed before the coupling-heads can be disengaged, and then a transverse movement when one of the lugs 18 registers with the notch 19 of the coöperating head. The angle or relative position of the heads in the uncoupling operation is always the same with accuracy, no play or side movement being permitted. The coupling operation is the reverse of that just described.

When two similar coupling-heads are brought together into engagement in the manner above described, the projecting pins 11 enter the holes in the opposite valve-stem, so that when the angular movements take place in making the coupling the valves 9 will be moved on account of such engagement of the pins 11. The angular movement of the valves is determined by the pins 7, fastened in the seats 2 and 10, so that if one valve moves ahead of the other it will come to a stop as soon as the notch in the valve 9 engages with its pin. The other valve then has to move. Both valves have now been positively and, in fact, automatically moved so that their ports or passages 16 have registered with the passages 3 in the valve-seats, thereby permitting the air or other fluid under pressure to traverse both heads, as indicated by the arrows in Fig. 1. When the heads are coupled, as shown, the projecting gaskets seat on each other. In disengaging the coupling-heads the action is reversed, with the result that both valves are automatically and positively moved and left in lap position, the ports being closed before the lugs of the heads are permitted to be disengaged, thereby avoiding all waste of air. The coupling-heads are thus not only positively closed against escape of air, but sealed against entrance of dust, dirt, sand, or other injurious foreign particles.

While for convenience I have described more or less precise forms and details of construction, it is evident that various changes may be made therein without, however, departing from the spirit of my invention, and consequently I desire it understood that my invention is not to be limited to structural details, except where so expressly required by the terms of some of the claims. Furthermore, I contemplate using my invention in connection with hose-couplings for whatever particular purpose employed. In fact, I contemplate so using the same wherever applicable.

I claim—

1. In hose-couplings, the combination of a coupling-head having a lug and also a flange which is provided with a notch in its edge, said notch being arranged to permit the lug of a similar coupling-head to pass through in the coupling and uncoupling operation.

2. In hose-couplings, the combination of heads each having a pair of lugs and a notch to receive one of the lugs of a similar head coupled thereto and valves in said heads operated by the relative movements of the heads in the coupling and uncoupling operations.

3. In hose-couplings, the combination of heads each having a pair of lugs 18 and a notch 19 to receive one of the lugs of a similar head coupled thereto, said notch and said received lug corresponding accurately to make a single and definite angle between two heads in the coupling and uncoupling operations, and valves in said heads operated by the relative movements of the heads and adapted to be closed just prior to the time said angle is attained.

4. In a hose-coupling, the combination with the head, of a valve-seat therein having a port or passage, a valve movable thereon and having a port adapted to register with the port in the valve-seat, means for rotating or moving said valve when the head is coupled to or uncoupled from a similar head, means for preventing disengagement of the heads until the valves are closed comprising the flange 20 having a notch 19 near one end of the flange but leaving a portion 20ᵃ, and projecting lugs 18 and 18ᵃ which are separated a distance equal to the width of the portion 20ᵃ, the lug 18ᵃ of a companion head being adapted to pass through the notch 19.

5. In a hose-coupling the combination with a head of a valve-seat therein having a port or passage, a valve movable thereon and having a port adapted to register with the port in the valve-seat, means for stopping the valve movement when said ports are in register, means for automatically moving said valve in the coupling and uncoupling operations, and means for compelling a lateral movement of the heads in the coupling and uncoupling operations, which latter means comprise a pair of lugs and a notch arranged on each of the two coöperating heads, the notch of one head being arranged to receive one of the lugs of the coöperating head.

6. In a hose-coupling, the combination with the head, of a rotary valve therein controlling the passage through the head and having a stem provided with a projecting pin and a hole or socket arranged off the valve center whereby such stem is adapted to engage the stem of a similar coupling-head thereby automatically moving both valves in the coupling and uncoupling operations.

7. In a hose-coupling, the combination with the head, of a valve-seat therein having a port or passage, a valve seating on said seat, and having a port or passage adapted to register with the port in the valve-seat, a valve-stem passing through the valve-seat and having at its end a projecting pin and an adjacent hole or socket arranged off the valve center whereby such stem may be engaged by a similar stem in a similar hose-coupling.

8. In a hose-coupling the combination with the head, of a valve-seat therein having a port or passage and also having a stationary projecting pin which is secured to such valve-seat, a valve seating on the seat and having a port or passage adapted to register with the valve-seat port, and also having a peripheral notch to receive the pin which limits the movement of such valve, and automatic means for moving the valve in the coupling and uncoupling operations.

9. In a hose-coupling the combination with the head, having an interior flange 5, provided with a hole 8, a valve-seat 2, having a port or passage and provided with a pin or screw 6 received by the hole 8, a valve 9 working on the seat and means for operating such valve.

10. In a hose-coupling, the combination with the head having a cap 14, a valve-seat 2 in the head and having a port or passage, a rotary disk valve 9 on such seat for governing said port, a spring 13 between such cap and valve and adapted to hold said valve in its seat and means for operating the valve.

11. In a hose-coupling, the combination with the head having an interior flange 5, a valve-seat 2, having a port or passage, a pin 6 passing through said flange and entering said seat, a gasket between such seat and flange and also projecting outwardly, a valve 9 on such seat for governing such port or passage, and means for operating such valve.

12. In a hose-coupling, the combination with the head having an interior annular flange provided with a hole 8, a port-provided valve-seat supported by said flange and having on one face a pin 6 entering such hole and on the other face a stop-pin 7, a valve governing such port and having a peripheral notch coöperating with the stop-pin and means for automatically operating said valve in the coupling and uncoupling operations.

13. In a hose-coupling, the combination with the head 1 having an interior flange 5 provided with a hole 8, a valve-seat 2, having ports 3 and on one face a pin 6 received by hole 8 and also on the other face a pin 7 and a valve comprising a valve-body 9, and stem 10, the valve-body working on said seat, and having ports 16 adapted to register with ports 3, the periphery of the valve-body having a notch 17 coöperating with pin 7, the valve-stem passing centrally through the valve-seat and having a pin 11 and hole or socket 16.

NIELS ANTON CHRISTENSEN.

Witnesses:
JOHN DADMUN,
A. BEVERIDGE.